United States Patent
Stanfill

(10) Patent No.: US 10,140,329 B2
(45) Date of Patent: Nov. 27, 2018

(54) PROCESSING TRANSACTIONS IN A DISTRIBUTED COMPUTING SYSTEM

(71) Applicant: Ab Initio Technology LLC, Lexington, MA (US)

(72) Inventor: Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 310 days.

(21) Appl. No.: 15/077,108

(22) Filed: Mar. 22, 2016

(65) Prior Publication Data

US 2016/0292213 A1    Oct. 6, 2016

Related U.S. Application Data

(60) Provisional application No. 62/141,388, filed on Apr. 1, 2015.

(51) Int. Cl.
G06F 17/30    (2006.01)
G06F 9/46    (2006.01)

(52) U.S. Cl.
CPC ........ G06F 17/30371 (2013.01); G06F 9/466 (2013.01); G06F 17/30312 (2013.01); G06F 17/30362 (2013.01)

(58) Field of Classification Search
USPC ................................................. 707/703–704
See application file for complete search history.

(56) References Cited

U.S. PATENT DOCUMENTS

2004/0199734 A1* 10/2004 Rajamani ................ G06F 9/524
                                                                                711/163
2013/0297580 A1    11/2013 Markus et al.
2013/0325827 A1* 12/2013 Markus ............ G06F 17/30345
                                                                                707/703

(Continued)

FOREIGN PATENT DOCUMENTS

EP    2439640    4/2012

OTHER PUBLICATIONS

Amiri et al., "Scalable Concurrency Control and Recovery for Shared Storage Arrays," retrieved from internet: [May 30, 2016]: http://repository.cmu.edu/cgi/viewcontent.cgi?article=1142&contect=pdl (XP055276130).

(Continued)

*Primary Examiner* — Hung T Vy
(74) *Attorney, Agent, or Firm* — Occhiuti & Rohlicek LLP

(57) ABSTRACT

Processing transactions in a distributed computing system that includes multiple processing modules includes: storing data items in a data storage system accessible to multiple processes running in the distributed computing system, where the data items are totally ordered according to an ordering rule, and at least some of the processes are running on different processing modules; and processing transactions using a plurality of the multiple processes. Processing a transaction using one of the plurality of the multiple processes includes: receiving a set of requests for accessing data items stored in the data storage system (where the requests are in a first order), obtaining locks on the data items sequentially in the first order if each of the locks is obtained within a first time interval, and, if any of the locks is not obtained within the first time interval, restarting the transaction being processed.

68 Claims, 5 Drawing Sheets

(56) References Cited

U.S. PATENT DOCUMENTS

2014/0236913 A1    8/2014  Chakradhar et al.

OTHER PUBLICATIONS

International Search Report and Written Opinion, PCT Application No. PCT/US2016/023554, dated Jun. 6, 2016 (18 pages).
Oracle, "Getting Started with Transaction Processing," *Oracle Berkeley DB, Java Edition*,12c Release 1, Library Version 12.1.6.0 (75 pages): 2014.

* cited by examiner

PROCESSING TRANSACTIONS IN A DISTRIBUTED COMPUTING SYSTEM

CROSS-REFERENCE TO RELATED APPLICATIONS

This application claims priority to U.S. Application Ser. No. 62/141,388, filed on Apr. 1, 2015, incorporated herein by reference.

BACKGROUND

This description relates to processing transactions in a distributed computing system.

A database is a structured set of persistent data that can be managed and queried using a software program. A transactional database management system is a relational database system that operates on (e.g., stores and manipulates) data in a database using database "transactions." In general, a database transaction symbolizes a single unit of work (including one or more operations) performed by the database management system on the database. To ensure that database transactions are processed reliably, database transactions must be atomic (i.e., a transaction, including all of its one or more operations, must either complete in its entirety or have no effect whatsoever), consistent (i.e., a transaction must move the database from one valid state to another valid state), isolated (i.e., concurrently executing transactions result in the same state in the database as would result if the transactions were executed serially), and durable (i.e., a committed transaction will remain committed regardless of system crashes, errors, and other issues). This set of properties of a database transaction is sometimes referred to as "ACID."

In some situations, one or more of the ACID properties may be relaxed under certain conditions, especially on systems for which strict adherence to ACID properties is challenging (e.g., distributed systems). In other situations, it is important that transactions retain ACID properties, even when a database is distributed among a number of database nodes. In a distributed system such as a distributed database, any distributed algorithm used to support any ACID properties needs to be implemented in a way that avoids deadlock among the nodes, as described in more detail below. However, for certain distributed algorithms (e.g., two-phase commit for atomic commitment, or two-phase locking for concurrency control) providing the ability to detect actual deadlock situations, or guaranteeing strict deadlock avoidance at all times, has consequences for system performance.

SUMMARY

In one aspect, in general, a method for processing transactions in a distributed computing system that includes multiple processing modules includes: storing data items in a data storage system accessible to multiple processes running in the distributed computing system, where the data items are totally ordered according to an ordering rule, and at least some of the processes are running on different processing modules; and processing transactions using a plurality of the multiple processes. Processing a transaction using one of the plurality of the multiple processes includes: receiving a set of requests for accessing data items stored in the data storage system, where the requests are in a first order, obtaining locks on the data items sequentially in the first order if each of the locks is obtained within a first time interval, determining a second order that is consistent with the ordering rule for at least two of the locks if any of the locks is not obtained within the first time interval, and restarting the transaction being processed, including obtaining locks on data items sequentially in the second order.

Aspects can include one or more of the following features.

Restarting the transaction being processed includes rolling back the transaction, releasing any existing locks on the data items.

The second order is consistent with the ordering rule for at least data items for which locks were obtained within the first time interval.

The processing further includes storing information identifying positions based on the ordering rule of data items for which locks were obtained within the first time interval, and determining the second order includes determining the second order based at least in part on the stored information identifying the positions.

Determining the second order includes sorting a list of operations for obtaining the locks according to the ordering rule.

The processing further includes determining whether or not the first order is consistent with the ordering rule, and waiting longer than the first time interval for locks on any data items for which a lock was not obtained within the first time interval if the first order is consistent with the ordering rule.

The processing further includes determining a priority of the process that received the set of requests relative to other processes of the plurality of the multiple processes.

Restarting the transaction being processed is performed after determining the priority.

Restarting the transaction being processed is performed after determining that a state of a lock on at least one data item for which access was requested by the set of requests has changed.

The processing further includes determining whether or not the first order is consistent with the ordering rule, and restarting the transaction being processed is performed after a second time interval from determining that first order is not consistent with the ordering rule.

The second time interval is longer than the first time interval.

The first time interval is less than one second.

The processing further includes: holding any locks obtained on the data items until the transaction being processed is committed, aborted, or restarted; and releasing the locks on the data items when the transaction being processed is committed, aborted, or restarted.

The locks on the data items include at least two states including a single unlocked state and one or more locked states.

Obtaining a lock on a data item includes changing the state of a lock associated with the data item into one of the locked states.

Releasing a lock on a data item includes changing the state of a lock associated with the data item from one of the locked states into the unlocked state.

The locks on the data items include at least one exclusive locked state that permits only a single process full access to a locked data item.

The locks on the data items include at least one shared locked state that permits multiple processes read-only access to a locked data item.

At least some of the multiple processes are running asynchronously from each other.

The transactions include database transactions and the data items are records in a database.

The database is an in-memory database.

The data storage system is distributed among multiple nodes of the database.

At least some of the plurality of the multiple processes are running on different ones of the processing modules.

In another aspect, in general, software is stored in a non-transitory form on a computer-readable medium, for processing transactions in a distributed computing system including multiple processing modules. The software includes instructions for causing a computing system to: store data items in a data storage system accessible to multiple processes running in the distributed computing system, where the data items are totally ordered according to an ordering rule, and at least some of the processes are running on different processing modules; and process transactions using a plurality of the multiple processes, where processing a transaction using one of the plurality of the multiple processes includes: receiving a set of requests for accessing data items stored in the data storage system, where the requests are in a first order, obtaining locks on the data items sequentially in the first order if each of the locks is obtained within a first time interval, determining a second order that is consistent with the ordering rule for at least two of the locks if any of the locks is not obtained within the first time interval, and restarting the transaction being processed, including obtaining locks on data items sequentially in the second order.

In another aspect, in general, a distributed computing system for processing transactions includes: a plurality of processing modules; and a data storage system storing data items, the data storage system accessible to multiple processes running in the distributed computing system, where the data items are totally ordered according to an ordering rule, and at least some of the processes are running on different processing modules. A plurality of the multiple processes process transactions. Processing a transaction using one of the plurality of the multiple processes includes: receiving a set of requests for accessing data items stored in the data storage system, where the requests are in a first order, obtaining locks on the data items sequentially in the first order if each of the locks is obtained within a first time interval, determining a second order that is consistent with the ordering rule for at least two of the locks if any of the locks is not obtained within the first time interval, and restarting the transaction being processed, including obtaining locks on data items sequentially in the second order.

In another aspect, in general, a method for processing transactions in a distributed computing system that includes multiple processing modules includes: storing data items in a data storage system accessible to multiple processes running in the distributed computing system, where the data items are totally ordered according to an ordering rule, and at least some of the processes are running on different processing modules; and processing transactions using a plurality of the multiple processes. Processing a transaction using one of the plurality of the multiple processes includes: receiving a set of requests for accessing data items stored in the data storage system, where the requests are in a first order, obtaining locks on the data items sequentially in the first order if each of the locks is obtained within a first time interval, determining whether or not the first order is consistent with the ordering rule if any of the locks is not obtained within the first time interval, and restarting the transaction being processed if the first order is not consistent with the ordering rule.

Aspects can include one or more of the following features.

Restarting the transaction being processed includes rolling back the transaction, releasing any existing locks on the data items, and obtaining locks on data items sequentially in a second order different from the first order.

The second order is consistent with the ordering rule for at least data items for which locks were obtained within the first time interval.

The processing further includes storing information identifying positions based on the ordering rule of data items for which locks were obtained within the first time interval, and determining the second order based at least in part on the stored information identifying the positions.

The second order is determined based on sorting a list of operations for obtaining the locks according to the ordering rule.

The processing further includes waiting longer than the first time interval for locks on any data items for which a lock was not obtained within the first time interval if the first order is consistent with the ordering rule.

The processing further includes determining a priority of the process that received the set of requests relative to other processes of the plurality of the multiple processes.

Restarting the transaction being processed if the first order is not consistent with the ordering rule is performed after determining the priority.

Restarting the transaction being processed if the first order is not consistent with the ordering rule is performed after determining that a state of a lock on at least one data item for which access was requested by the set of requests has changed.

Restarting the transaction being processed if the first order is not consistent with the ordering rule is performed after a second time interval from determining that first order is not consistent with the ordering rule.

The second time interval is longer than the first time interval.

The first time interval is less than one second.

The processing further includes: holding any locks obtained on the data items until the transaction being processed is committed, aborted, or restarted; and releasing the locks on the data items when the transaction being processed is committed, aborted, or restarted.

The locks on the data items include at least two states including a single unlocked state and one or more locked states.

Obtaining a lock on a data item includes changing the state of a lock associated with the data item into one of the locked states.

Releasing a lock on a data item includes changing the state of a lock associated with the data item from one of the locked states into the unlocked state.

The locks on the data items include at least one exclusive locked state that permits only a single process full access to a locked data item.

The locks on the data items include at least one shared locked state that permits multiple processes read-only access to a locked data item.

At least some of the multiple processes are running asynchronously from each other.

The transactions include database transactions and the data items are records in a database.

The database is an in-memory database.

The data storage system is distributed among multiple nodes of the database.

At least some of the plurality of the multiple processes are running on different ones of the processing modules.

In another aspect, in general, software is stored in a non-transitory form on a computer-readable medium, for processing transactions in a distributed computing system including multiple processing modules. The software includes instructions for causing a computing system to: store data items in a data storage system accessible to multiple processes running in the distributed computing system, where the data items are totally ordered according to an ordering rule, and at least some of the processes are running on different processing modules; and process transactions using a plurality of the multiple processes, where processing a transaction using one of the plurality of the multiple processes includes: receiving a set of requests for accessing data items stored in the data storage system, where the requests are in a first order, obtaining locks on the data items sequentially in the first order if each of the locks is obtained within a first time interval, determining whether or not the first order is consistent with the ordering rule if any of the locks is not obtained within the first time interval, and restarting the transaction being processed if the first order is not consistent with the ordering rule.

In another aspect, in general, a distributed computing system for processing transactions includes: a plurality of processing modules; and a data storage system storing data items, the data storage system accessible to multiple processes running in the distributed computing system, where the data items are totally ordered according to an ordering rule, and at least some of the processes are running on different processing modules. A plurality of the multiple processes process transactions. Processing a transaction using one of the plurality of the multiple processes includes: receiving a set of requests for accessing data items stored in the data storage system, where the requests are in a first order, obtaining locks on the data items sequentially in the first order if each of the locks is obtained within a first time interval, determining whether or not the first order is consistent with the ordering rule if any of the locks is not obtained within the first time interval, and restarting the transaction being processed if the first order is not consistent with the ordering rule.

Aspects can include one or more of the following advantages.

Among other advantages, the aspects prevent deadlock in distributed databases while maintaining system performance.

Aspects ensure that transactions do not starve due to being continually rolled back.

Aspects optimistically try to obtain locks on data items according to an order specified by a transaction and, if unsuccessful, revert to a known deadlock-free locking order.

Other features and advantages of the invention will become apparent from the following description, and from the claims.

DESCRIPTION

1 Overview

Figure 1:
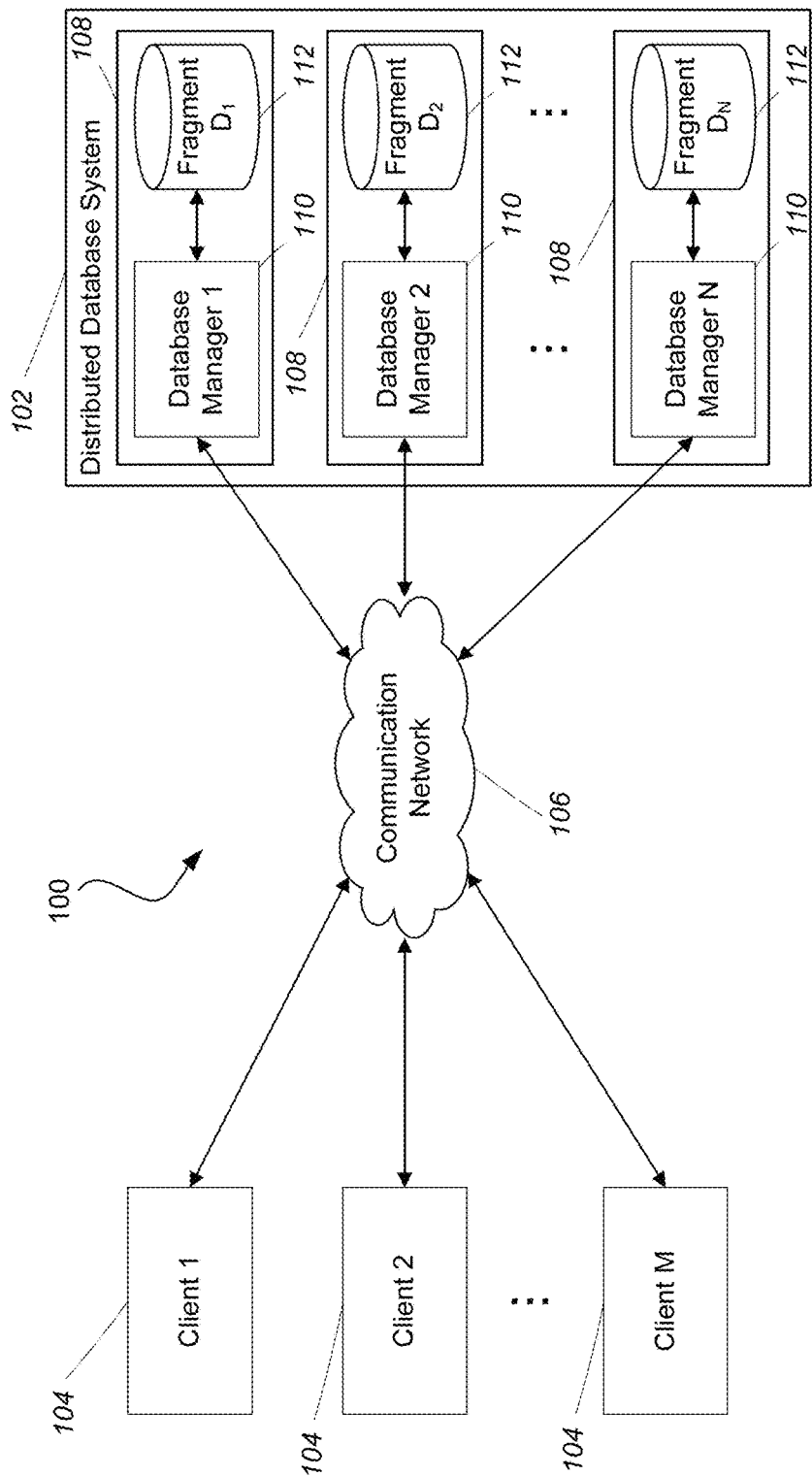
FIG. 1 is a block diagram of a data processing system including a distributed database system.

FIG. 1 shows an example of a data processing system 100 in which the deadlock avoidance techniques can be used. The system 100 includes a distributed database system 102 that is in communication with M database clients 104 over a communication network 106 (e.g., a WAN, a LAN, or a network in a multi-processor system or on a chip).

The distributed database system 102 includes N nodes 108 over which fragments $D_n$ of a database, D are allocated. Each node 108 includes a data storage device 112 on which a fragment of the database, D is stored and a database manager 110, which is a processing module (e.g., controlled by a server computer, a processor, or a processor core) that manages the fragment of the database on the data storage device 112. The database manager 110 for a given node 108 also serves as an interface between the fragment of the database on the data storage device 112 and entities external to the node 108 such as the clients 104 and other nodes 108. Though not explicitly shown in FIG. 1, in some examples, each database manager 110 includes a data processor that is responsible for management of the fragment of the database stored on the data storage device 112 managed by the database manager 110, an application processor for processing requests that require access to database fragments on more than one node 108, and communications software for communicating with the clients 104 and with other nodes 108.

In operation, the clients 104 specify one or more database transactions for execution on the database, D. The transactions specified by the clients 104 are sent over the communication network 106 to one or more of the database managers 110 of the nodes 108. When a transaction arrives at an $n^{th}$ database manager 110 of the N nodes 108, the $n^{th}$ database manager 110 evaluates the transaction and generates an access plan (e.g., a query plan) for executing the transaction on the fragment of the database stored on the $n^{th}$ data storage device 112 that is managed by the $n^{th}$ database manager 110.

In some examples, when a transaction accesses multiple fragments of the database stored on multiple nodes 108, the $n^{th}$ database manager 110 forwards the transaction and/or the access plan to the database managers 110 of the multiple nodes 108. In other examples, the client 104 from which the transaction originated sends the transaction to the appropriate nodes 108 required for completing the transaction. In yet other examples, the client 104 from which the transaction originated sends the transaction to one of the nodes 108 that is designated as a leader node and the leader node sends appropriate access plans to the appropriate nodes 108 required for completing the transaction.

With access plans for the one or more database transactions in place at the appropriate nodes 108, the one or more transactions can execute and access the database. As is the case with conventional, centralized transactional databases, the one or more transactions may conflict with one another, resulting in some transactions successfully completing and other transactions failing, at which point they are forced to undo their changes and restart.

2 Deadlock

One potential conflict that arises between transactions is deadlock. Very generally, deadlock is a situation in which two or more concurrently executing transactions each require a resource that the other transaction has exclusive access to and must wait for the other transaction to release the resource before completing. Left unchecked, none of the two or more concurrently executing transactions ever completes because they are never able to gain access to their required resources.

Figure 2:
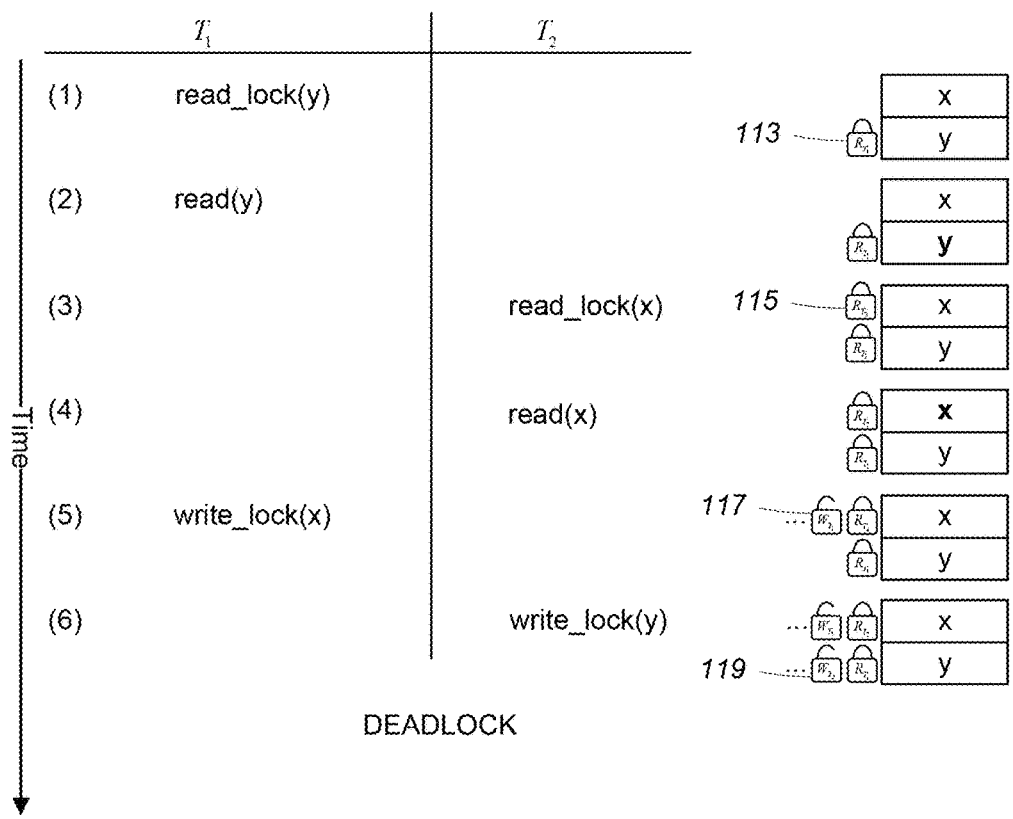
FIG. 2 illustrates a deadlock between two database transactions.

Referring to FIG. 2 a classical example of a situation where deadlock occurs is illustrated. In the example, two transactions $T_1$ and $T_2$ operate concurrently on data elements x and y, stored in a transactional database. $T_1$ includes operations for reading the value of data element y and writing a value to data element x. $T_2$ includes operations for reading the value of data element x and writing a value to data element y. As used herein, a "lock" is any mechanism for preventing concurrent access to a particular data element by any entity other than an entity that acquires the lock on that particular data element. There can be multiple types of locks depending on the type of access being performed/prevented. For example, a "read lock" is a lock preventing any other entity from reading a data element, and a "write lock" is a lock preventing any other entity from writing a data element.

At a first time step (1), $T_1$ issues a read_lock(y) command to obtain a read lock, $R_{T1}$ 113 on data element y. At a second time step (2), $T_1$ issues a read(y) command to read the value of y. At a third time step (3), $T_2$ issues a read_lock(x) command to obtain a read lock, $R_{T2}$ 115 on data element x. At a fourth time step (4), $T_2$ issues a read(x) command to read the value of x.

At a fifth time step (5), $T_1$ issues a write_lock(x) command to attempt to obtain a write lock, $W_{T1}$ 117 on data element x. However, $T_2$ already has a read lock on data element x, so $T_1$ must wait until $T_2$ has released its read lock on data element x before it can obtain its write lock, $W_{T1}$ 117. Similarly, at a sixth time step (6), $T_2$ issues a write_lock(y) command to attempt to obtain a write lock, $W_{T2}$ 119 on data element y. However, $T_1$ already has a read lock on data element y, so $T_2$ must wait until $T_1$ has released its read lock on data element y before it can obtain its write lock, $W_{T2}$ 119.

At this point a deadlock has occurred since neither $T_1$ nor $T_2$ will release its read lock until it has completed its transaction, yet for either transaction to make progress, the other must release its read lock. Once a deadlock such as the deadlock illustrated in FIG. 2 has occurred, the only way to make progress is to break the deadlock by rolling back one of the transactions and allowing the other to complete.

3 Deadlock Avoidance

In conventional, centralized transactional databases methods for detection, prevention, and/or avoidance of deadlocks such as the deadlock described above are well known. However, in a distributed database, finding a solution for detecting and avoiding deadlocks becomes increasingly difficult since there is a potential for multiple concurrently executing transactions, each operating on data stored by multiple different nodes 108 of the distributed database system 102. Some distributed database operations correspond to problems in distributed computing that are known to be difficult to solve, especially with fault tolerant algorithms. For some types of faults, some problems in distributed computing have even been proven to be impossible to solve with a fault tolerant distributed algorithm.

Figure 3:
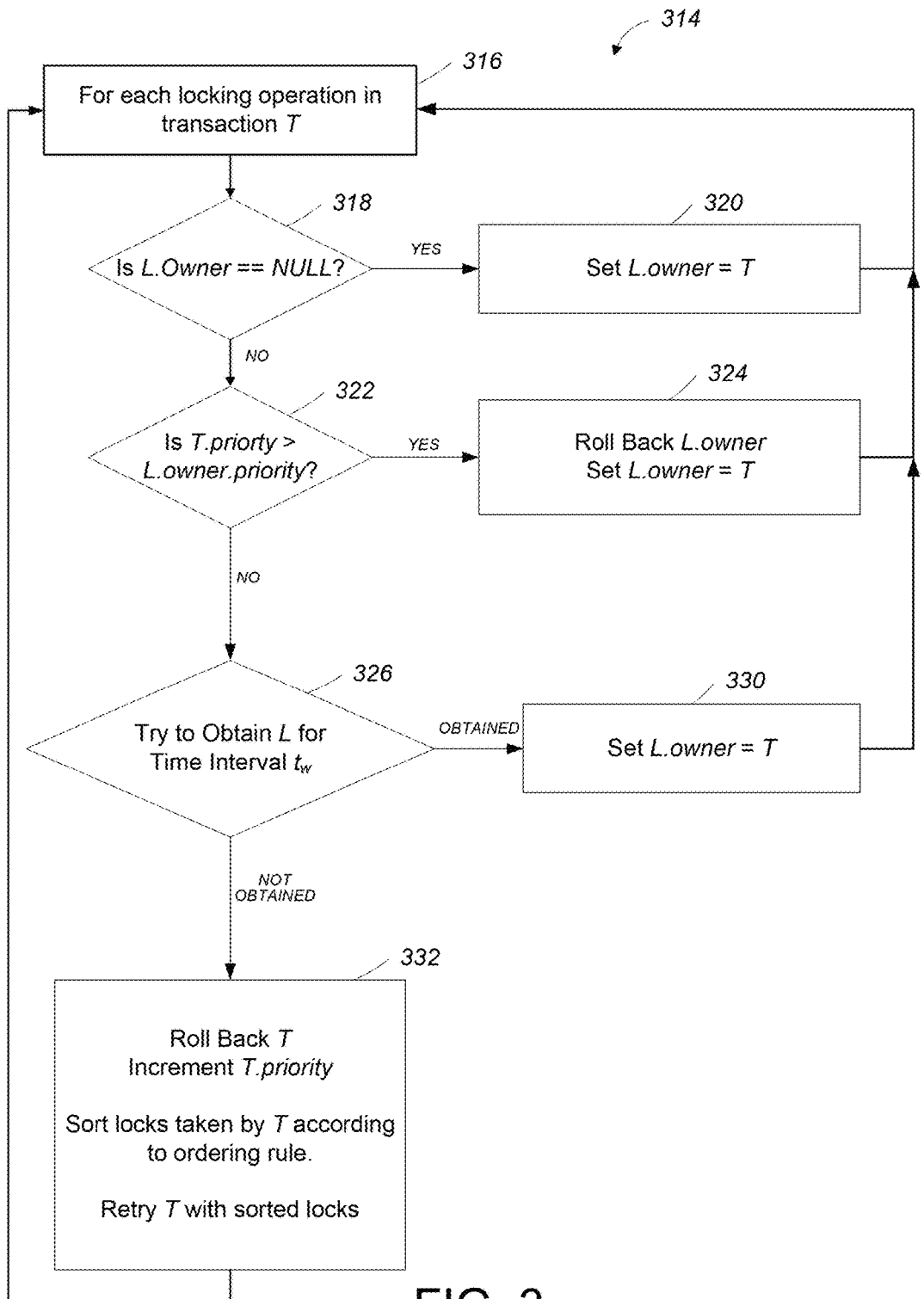
FIG. 3 is a flow chart of a pre-emptive deadlock avoidance algorithm.

Referring to FIG. 3, in some examples, the distributed database system 102 avoids deadlocks using a "pre-emptive deadlock avoidance" algorithm 314 that undoes (or rolls-back) a transaction if there is a possibility that the transaction is deadlocked or will deadlock, even if deadlock has not yet actually occurred. Additionally, the algorithm 314 is able to reduce some of the overhead that would otherwise be imposed in an ordered locking scheme by limiting the need to require consistency with an ordering rule to only certain situations in which locks are not obtained quickly, as described in more detail below.

A pre-requisite of the pre-emptive deadlock avoidance algorithm 314 is that the data items stored in the distributed database are totally ordered according to an ordering rule. A "totally ordered" (or "linearly ordered") set of items is one in which every item in a pair of items in the set has a defined order with respect to the other item in the pair, according to the ordering rule (also called "comparability" or "totality"). In a "partially ordered" set, by contrast, not every pair of items has to have a defined order with respect to each other. A totally ordered set also has other properties (e.g., anti-symmetry and transitivity), which are also true of a partially ordered set.

One simple example of such an ordering rule that is totally ordered is to assign a different number of a series of numbers to each data item in the database. For example, a first data element in the database would be assigned the number 1, a second data element in the database would be assigned the number 2, and so on. Of course, other more complex ordering rules can be used. For example, each of the nodes 108 may independently assign numbers to its data items so that numbers on any given node are unique within the respective database fragment, and then a check for duplicates between different nodes is performed. If there are any duplicates found, then a tie breaker rule is used to change some or all of the numbers to ensure that different numbers (or totally ordered character strings) are assigned to different data items over all of the nodes. An example of a tie breaker rule that can be used if duplicates are found is the following rule for re-assigning all numbers on each of N nodes, where 'i' is the original local number assigned to a data item and 'j' is the number of the node (from 1 to N): (i+j) mod N.

One property of a database with totally ordered data items is that if locks on the data items are only acquired in an order consistent with the ordering rule of the data items, then no deadlock is possible. That is, if a transaction acquires a lock on a data item with the number 1 and then acquires a lock on a data item with the number 2, then no deadlock can occur (assuming that all other transactions are acquiring locks in an order consistent with the ordering rule). However, if a transaction acquires a lock on a data item with the number 2 and then acquires a lock on the data item 1, then a deadlock is possible (though not guaranteed), depending on the relative timing of the transactions.

Very generally, the pre-emptive deadlock avoidance algorithm 314 first allows a transaction to attempt to obtain locks on data items in any order and does not force the transaction to attempt to obtain locks in an order consistent with the ordering rule. If any of the locks that the transaction attempts to obtain is not obtained within a predefined time interval, then the transaction is rolled back due to the possibility that a deadlock has occurred or will occur. In some examples, the time interval is sufficiently long that any two transactions that are acquiring locks in an order consistent with the ordering rule are likely to obtain their locks within the time interval.

For any transaction that is rolled back, the locking operations of the transaction are sorted to be consistent with the ordering rule. The transaction is then restarted and the locking operations are performed in the sorted order. The restarted transaction will make deadlock free progress, at least with respect to acquiring locks, since it acquires its locks in an order consistent with the ordering rule and has a higher priority than transactions that are making their first attempt. That is, the example algorithm 314 described below will roll back any transactions that are on their first attempt due to the restarted transaction having a higher priority than the transactions that are on their first attempt. As a result, the restarted transaction only competes for locks with transactions that have been previously rolled back and are acquiring at least some of their locks in an order consistent with the locking order. In other examples of the algorithm, the ordering determination after a time interval is still used, but relative priorities between transactions are not necessarily used, so deadlock is still prevented but the requirement to make progress is not necessarily strict.

More specifically, in a first step 316 of the algorithm 314, a loop condition is checked to see if there is a next locking operation to be performed as the loop progresses sequentially through a list of locking operations (i.e., one locking operation at a time in the sequence indicated by the list) executed by a transaction, T, and for each locking operation, the algorithm 314 begins an attempt to obtain a lock, L on a data item identified by that locking operation. In a second step 318, the locking operation checks L.owner (i.e., a property of the lock L representing which, if any, transactions already possesses the lock, L) to determine whether its value is equal to NULL. If so, then no transaction currently possesses the lock, L and the algorithm proceeds to a third step 320 in which the transaction, T takes possession of the lock, L. In the third step 320, L.owner is set to T, and the loop returns to step 316.

If L.owner is not equal to NULL, then another transaction already possesses the lock, L and algorithm proceeds to a fourth step 322 in which T.priority (i.e., a property representing a processing priority of the transaction, T) is compared to a priority of L.owner (i.e., a property representing a processing priority of the transaction that currently possesses the lock, L). If T.priority is greater than L.owner.priority, then the algorithm 314 proceeds to a fifth step 324 in which the transaction currently possessing the lock, L (i.e., L.owner) is rolled back. The transaction, T then takes possession of the lock, L at which time L.owner is set to T, and the loop returns to step 316. If T.priority is less than or equal to L.owner.priority, the algorithm 314 proceeds to a sixth step 326 in which the transaction is allowed an interval of time (or "time interval" or "time delay"), $t_w$ to try to obtain the lock, L.

If the lock, L is released within the interval of time, $t_w$ causing L.owner to become equal to NULL, the algorithm 314 proceeds to a seventh step 330 in which the transaction T takes possession of the lock, L, and the loop returns to step 316. In the seventh step 330, L.owner is set to T. Alternatively, if during the time interval, $t_w$ the other transaction never releases the lock, L, the algorithm proceeds to an eighth step 332. In the eighth step 332, the algorithm 314 rolls back all operations issued by the transaction T. The eighth step 332 then sorts the list of locking operations executed by T to be consistent with the ordering rule of the data items and increments T.priority. The algorithm 314 then restarts the transaction, T by returning to step 316 with the loop condition reinitialized to the beginning of the list of sorted locking operations, so the locks of the locking operations will now be obtained sequentially in the sorted order.

A variety of other examples of pre-emptive deadlock avoidance algorithms can alternatively be used that apply different solutions than the example algorithm 314, but which still avoid deadlock in a manner that reduces overhead as in the algorithm 314. For example, instead of rolling back and sorting the locking operations (in step 332) for every transaction after a particular time delay, the algorithm may instead first determine whether or not the order in which any initial locks were obtained is consistent with the ordering rule. If the initial locks were obtained in an order consistent with the ordering rule, then the delay is not due to deadlock and the transaction can continue to wait for the lock for a longer time interval before rolling back the transaction. If, however, the initial locks were not obtained in an order consistent with the ordering rule, then the transaction is rolled back and restarted with a sorted list due to the possibility that a deadlock has occurred. Thus, some algorithms include a step to determining whether or not the first order is consistent with the ordering rule, and other algorithms (such as algorithm 314) do not include such a step.

3.1 Examples

Figure 4:
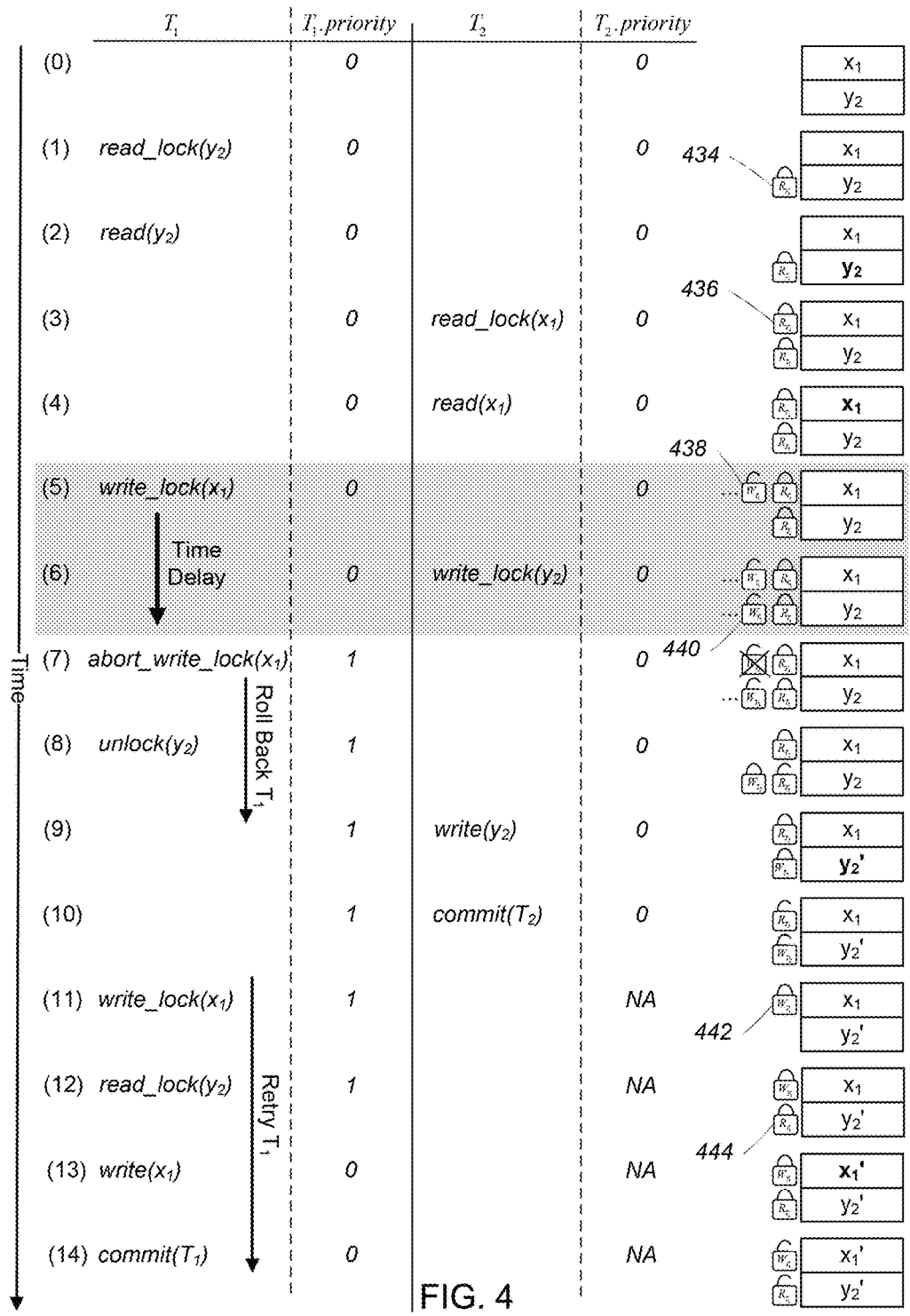
FIG. 4 illustrates an application of the algorithm of FIG. 3 to a first potential deadlock situation.

Referring to FIG. 4, in an exemplary application of the pre-emptive deadlock avoidance algorithm 314, two transactions, $T_1$ and $T_2$ are concurrently operating on data items (including data items x and y) of a distributed database. The data items are numbered in order according to an ordering rule, with x assigned the number 1 and y assigned the number 2. For the sake of simplifying the following discussion, the data items are referred to as $x_1$ and $y_2$.

At an initial time step (0), no transaction possesses a lock on $x_1$ or $y_2$. At a first time step (1), $T_1$ attempts to obtain a lock on $y_2$ by issuing a read_lock($y_2$) command. To do so, $T_1$ applies the second step 318 of the pre-emptive deadlock avoidance algorithm 314 and determines whether L.owner for $y_2$ equals NULL. Since no other transaction possesses a write lock on $y_2$ at the first time step (1), $T_1$ proceeds to the third step 320 of the algorithm 314 and successfully obtains a read lock, $R_{T_1}$ 434 on $y_2$. Upon obtaining the read lock, $R_{T_1}$ 434 on $y_2$, L.owner for $y_2$ is set to $T_1$.

At a second time step (2), $T_1$ attempts to read the value of $y_2$ by issuing a read($y_2$) command. Since $T_1$ possesses a read lock on $y_2$, $T_1$ successfully reads the value of $y_2$.

At a third time step (3), $T_2$ attempts to obtain a lock on $x_1$ by issuing a read_lock($x_1$) command. To do so, $T_2$ applies the second step 318 of the pre-emptive deadlock avoidance algorithm 314 and determines whether L.owner for $x_1$ equals NULL. Since no other transaction possesses a write lock on $x_1$ at the third time step (3), $T_2$ proceeds to the third step 320 of the algorithm 314 and successfully obtains a read lock, $R_{T_2}$ 436 on $x_1$. Upon obtaining the read lock, $R_{T_2}$ 436 on $x_1$, L.owner for $x_1$ is set to $T_2$.

At a fourth time step (4), $T_2$ attempts to read the value of $x_1$ by issuing a read($x_1$) command. Since $T_2$ possesses a read lock on $x_1$, $T_2$ successfully reads the value of $x_1$.

At a fifth time step (5), $T_1$ attempts to obtain a write lock on $x_1$ by issuing a write_lock($x_1$) command. To do so, $T_1$ applies the second step 318 of the pre-emptive deadlock avoidance algorithm 314 and determines whether L.owner for $x_1$ equals NULL. Since $T_2$ still possesses a read lock on $x_1$ (i.e., L.owner for $x_1$ equals $T_2$), $T_1$ proceeds to the fourth step 322 of the algorithm 314 and determines whether $T_1$ has a greater priority than $T_2$. At the fifth time step (5), both $T_1$ priority and $T_2$.priority are equal to zero, so $T_1$ proceeds to the sixth step 326 of the algorithm 314 and tries to obtain the write lock on $x_1$ for a time interval, $t_w$.

At a sixth time step (6), while $T_1$ is still waiting to obtain the write lock on $x_1$, $T_2$ attempts to obtain a write lock on $y_2$ by issuing a write_lock($y_2$) command. To do so, transaction $T_2$ applies the second step 318 of the pre-emptive deadlock avoidance algorithm 314 and determines whether L.owner for $y_2$ equals NULL. Since $T_1$ still possesses a read lock on $y_2$ (i.e., L.owner for $y_2$ equals $T_1$), $T_2$ proceeds to the fourth step 322 of the algorithm 314 and determines whether $T_2$ has a greater priority than $T_1$. At the fifth time step (5), both $T_1$.priority and $T_2$.priority are equal to zero, so $T_2$ proceeds to the sixth step 326 of the algorithm 314 and tries to obtain the write lock on $y_2$ for a time interval, $t_w$.

At a seventh time step (7), the time interval $t_w$ for transaction $T_1$ to try to obtain a write lock on $x_1$ lapses without $T_1$ ever obtaining the write lock on $x_1$ (since the read lock $R_{T_2}$ 436 was not released during the time interval, $t_w$). The algorithm 314 proceeds to the eighth step 332 and rolls back the transaction $T_1$ including aborting its attempt at obtaining a write lock on $x_1$ at the seventh time step (7) and releasing its read lock on $y_2$ at an eighth time step (8). By rolling back a deadlock between $T_1$ and $T_2$ is avoided. Since $T_1$ was rolled back, $T_1$.priority is incremented from zero to one (see FIG. 5) by the eighth step 332 of the algorithm 314. By increasing the priority of $T_1$, the algorithm 314 ensures that $T_1$ does not starve due to repeatedly being rolled back. Finally, the eighth step 332 of the algorithm 314 examines the locking operations that $T_1$ issued prior to being rolled back and sorts them to be consistent with the ordering rule of the data items. For $T_1$, the locking operations are sorted as:

(1) write_lock($x_1$)
(2) read_lock($y_2$)

Once $T_1$'s read lock on $y_2$ is released, transaction $T_2$ is able to successfully obtain the write lock, $W_{T_2}$ 440 on $y_2$. At a ninth time step (9), transaction $T_2$ issues a write($y_2$) command and overwrites $y_2$ with a new value, $y_2'$. At a tenth time step (10), transaction $T_2$ issues a commit($T_2$) command to commit its changes to the database. After $T_2$'s changes are committed, the read lock $R_{T_2}$ 436 on $x_1$ and the write lock, $W_{T_2}$ 440 on $y_2'$ are released and transaction $T_2$ is complete.

At an eleventh time step (11), $T_1$ begins a second attempt. In the second attempt, $T_1$ re-issues the locking operations that it issued in its first attempt at the very beginning of the transaction and in the sorted order (i.e., in the order consistent with the ordering rule of the data items). That is, at the eleventh time step (11), $T_1$ attempts to obtain a write lock on $x_1$ by issuing a write_lock($x_1$) command. To do so, $T_1$ applies the second step 318 of the pre-emptive deadlock avoidance algorithm 314 and determines whether L.owner for $x_1$ equals NULL. Since no other transaction possesses a write lock on $x_1$ at the eleventh time step (11), $T_1$ proceeds to the third step 320 of the algorithm 314 and successfully obtains a write lock, $W_{T_1}$ 442 on $x_1$. Upon obtaining the write lock $W_{T_1}$ 442 on $x_1$, L.owner for $x_1$ is set to $T_1$.

At a twelfth time step (12), $T_1$ attempts to obtain a read lock on $y_2'$ by issuing a read_lock($y_2$) command. To do so, the first transaction $T_1$ applies the second step 318 of the pre-emptive deadlock avoidance algorithm 314 and determines whether L.owner for $y_2'$ equals NULL. Since no other transaction possesses a write lock on $y_2'$ at the twelfth time step (12), $T_1$ proceeds to the third step 320 of the algorithm 314 and successfully obtains a read lock, $R_{T_1}$ 444 on $y_2'$. Upon obtaining the read lock $R_{T_1}$ 444 on $y_2'$, L.owner for $y_2'$ is set to $T_1$.

At a thirteenth time step (13), transaction $T_1$ issues a write($x_1$) command and overwrites $x_1$ with a new value, $x_1'$. At a fourteenth time step (14), transaction $T_1$ issues a commit($T_1$) command to commit its changes to the database. After $T_1$'s changes are committed, the read lock $R_{T_1}$ 444 on $y_2$ and the write lock, $W_{T_1}$ 442 are released and transaction $T_1$ is complete.

Figure 5:
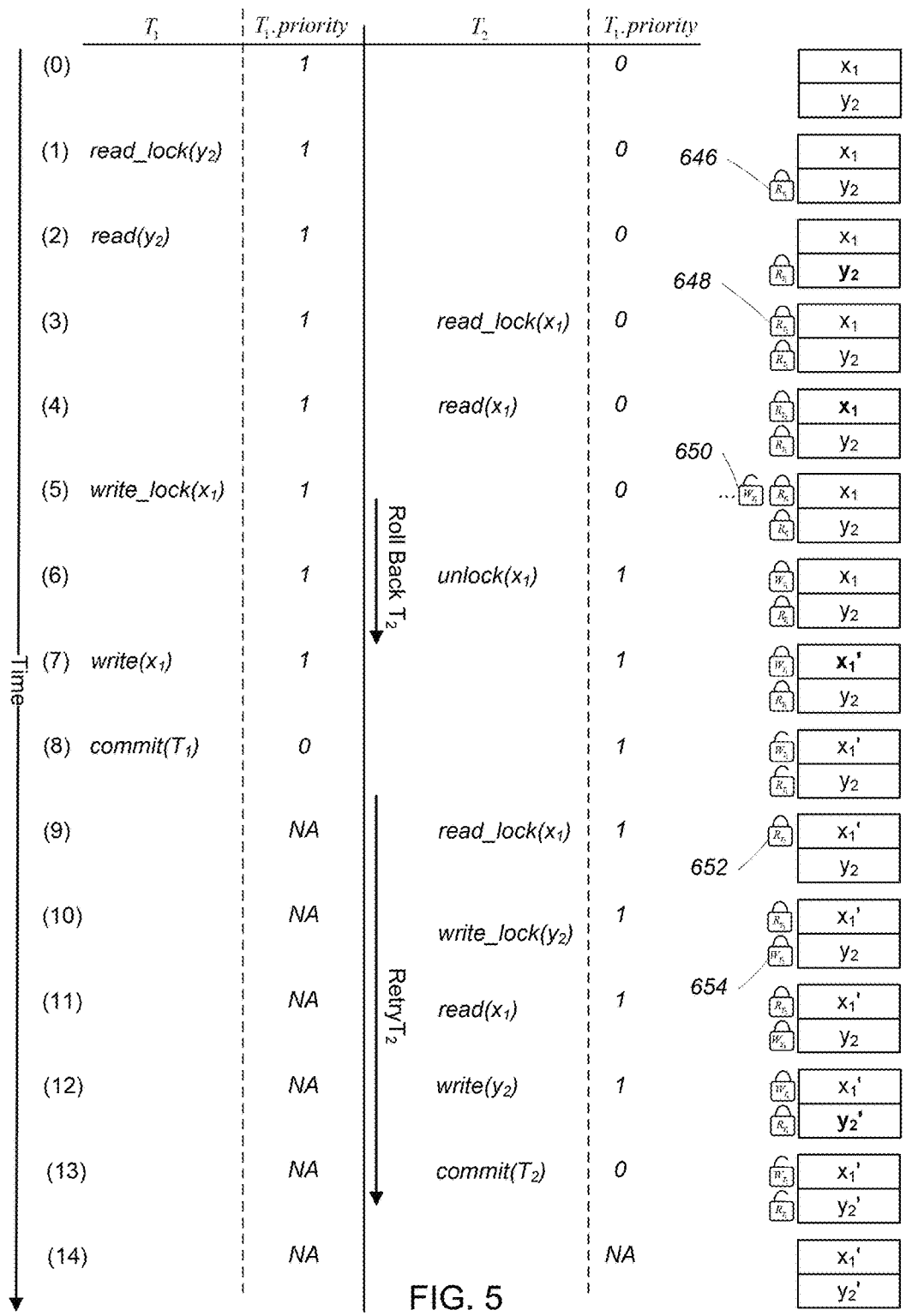
FIG. 5 illustrates an application of the algorithm of FIG. 3 to a second potential deadlock situation.

Referring to FIG. 5, in another exemplary application of the pre-emptive deadlock avoidance algorithm 314, two transactions, $T_1$ and $T_2$ are concurrently operating on data items (including data items $x_1$ and $y_2$) of the distributed database. In this example, the first transaction $T_1$ has previously been rolled back and $T_1$.priority is equal to 1.

At an initial time step (0), no transaction possesses a lock on $x_1$ or $y_2$. At a first time step (1), $T_1$ attempts to obtain a lock on $y_2$ by issuing a read_lock($y_2$) command. To do so, $T_1$ applies the second step 318 of the pre-emptive deadlock avoidance algorithm 314 and determines whether L.owner for $y_2$ equals NULL. Since no other transaction possesses a write lock on $y_2$ at the first time step (1), $T_1$ proceeds to the third step 320 of the algorithm 314 and successfully obtains a read lock, $R_{T_1}$ 646 on $y_2$. Upon obtaining the read lock $R_{T_1}$ 646 on $y_2$, L.owner for $y_2$ is set to $T_1$.

At a second time step (2), $T_1$ attempts to read the value of $y_2$ by issuing a read($y_2$) command. Since $T_1$ possesses a read lock on $y_2$, $T_1$ successfully reads the value of $y_2$.

At a third time step (3), $T_2$ attempts to obtain a lock on $x_1$ by issuing a read_lock($x_1$) command. To do so, $T_2$ applies the second step 318 of the pre-emptive deadlock avoidance algorithm 314 and determines whether L.owner for $x_1$ equals NULL. Since no other transaction possesses a write lock on $x_1$ at the third time step (3), $T_2$ proceeds to the third step 320 of the algorithm 314 and successfully obtains a read lock, $R_{T_2}$ 648 on $x_1$. Upon obtaining the read lock $R_{T_2}$ 648 on $x_1$, L.owner for $x_1$ is set to $T_2$.

At a fourth time step (4), $T_2$ attempts to read the value of $x_1$ by issuing a read($x_1$) command. Since $T_2$ possesses a read lock on $x_1$, $T_2$ successfully reads the value of $x_1$.

At a fifth time step (5), $T_1$ attempts to obtain a write lock on $x_1$ by issuing a write_lock($x_1$) command. To do so, $T_1$ applies the second step 318 of the pre-emptive deadlock avoidance algorithm 314 and determines whether L.owner for $x_1$ equals NULL. Since $T_2$ still possesses a read lock on $x_1$ (i.e., L.owner for $x_1$ equals $T_2$), $T_1$ proceeds to the fourth step 322 of the algorithm 314 and determines whether $T_1$ has a greater priority than $T_2$. At the fifth time step (5), $T_1$.priority equals 1 and $T_2$.priority equals 0. As such, $T_1$ proceeds to the fifth step 324 of the algorithm 314 and rolls back $T_2$ including, at a sixth time step (6), issuing an unlock($x_1$) command to release $T_2$'s read lock, $R_{T_2}$ 646 on $x_1$. Since $T_2$ was rolled back, $T_2$.priority is incremented from zero to one by the fifth step 324 of the algorithm 314.

Once $T_2$'s read lock, $R_{T_2}$ 648 on $x_1$ is released, $T_1$ is able to successfully obtain the write lock, $W_{T_1}$ 650 on $x_1$. At a seventh time step (7), $T_1$ issues a write($x_1$) command and overwrites $x_1$ with a new value $x_1'$. At an eighth time step (8), $T_1$ issues a commit($T_1$) command to commit its changes to the database. After $T_1$'s changes are committed, the read lock $R_{T_1}$ 646 on $y_2$ and the write lock, $W_{T_1}$ 650 on $x_1'$ are released and transaction $T_1$ is complete.

At a ninth time step (9), $T_2$ begins a second attempt. In the second attempt, $T_2$ attempts to obtain a read lock on $x_1'$ by issuing a read lock($x_1$) command. To do so, $T_2$ applies the second step 318 of the pre-emptive deadlock avoidance algorithm 314 and determines whether L.owner for $x_1$ equals NULL. Since no other transaction possesses a write lock on $x_1'$ at the ninth time step (9), $T_2$ proceeds to the third step 320 of the algorithm 314 and successfully obtains a read lock, $R_{T_2}$ 652 on $x_1'$. Upon obtaining the read lock, $R_{T_2}$ 652 on $x_1'$, L.owner for $x_1'$ is set to $T_2$.

At a tenth time step (10), $T_2$ attempts to obtain a write lock on $y_2$ by issuing a write_lock($y_2$) command. To do so, the second transaction $T_2$ applies the second step 318 of the pre-emptive deadlock avoidance algorithm 314 and determines whether L.owner for $y_2$ equals NULL. Since no other transaction possesses a write lock on $y_2$ at the tenth time step (10), $T_2$ proceeds to the third step 320 of the algorithm 314 and successfully obtains a write lock, $W_{T_2}$ 654 on $y_2$. Upon obtaining the write lock, $W_{T_2}$ 654 on $y_2$, L.owner for $y_2$ is set to $T_2$.

At an eleventh time step (11), $T_2$ issues a read($x_1'$) command to read the value of $x_1'$. At a twelfth time step (12), $T_2$ issues a write($y_2$) command and overwrites the value of $y_2$ with a new value, $y_2'$. At a thirteenth time step (13), $T_2$ issues a commit($T_2$) command to commit its changes to the database. After $T_2$'s changes are committed, the read lock, $R_{T_2}$ 652 on $x_1$ and the write lock, $W_{T_2}$ 654 on $x_1'$ are released and transaction $T_2$ is complete.

4 Alternatives

In some examples, as locking operations are performed on data items in the first attempt of a transaction, positions of the data items based on the ordering rule are stored for later use in sorting the locking operations. For example, positions of data items for which locks were obtained within a first time delay can be stored. Instead of requiring all locks in the transaction to be sorted, it may be sufficient for ensuring forward progress to simply sort only those locks that were initially obtained within the first time delay, which may not require as much work for transactions with a large number of locking operations.

In some examples, the time interval for waiting for a locking operation to complete is longer if the locking operation is consistent with the ordering rule.

In some examples, a transaction is only restarted after a second time interval. In some examples, the second time interval is longer than the time interval over which a locking operation is allowed to try to obtain a lock.

In some examples, the time interval that a locking operation is allowed to try to obtain a lock is less than one second (e.g., e.g., 100 ms, 1 ms, 100 microseconds, 1 microsecond, or 0.1 microseconds). In some examples, the time interval that a locking is allowed to try to obtain a lock is about zero seconds.

In some examples, a lock for a given data item can have a plurality of states including a single unlocked state and one or more locked states. In some examples, the one or more locked states include an exclusive write lock state and a non-exclusive, multi-read locked state.

In some examples, the transactions being executed on the distributed database system are asynchronously executing transactions. In some examples, the database is an in-memory database.

Various other alternative techniques can be used including various features described herein, including features described in the Summary section above.

5 Implementations

The deadlock avoidance approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for processing transactions in a distributed computing system including multiple processing modules to achieve deadlock-free transaction processing, the method including:

storing data items in a data storage system accessible to multiple processes running in the distributed computing system, where the data items are totally ordered according to an ordering rule, and at least some of the processes are running on different processing modules; and processing transactions using a plurality of the multiple processes, where processing a transaction using one of the plurality of the multiple processes includes receiving a set of requests for accessing data items stored in the data storage system, where the requests are in a first order, obtaining locks on the data items sequentially in the first order if each of the locks is obtained within a first time interval, determining a second order that is consistent with the ordering rule for at least two of the locks if any of the locks is not obtained within the first time interval, and restarting the transaction being processed, including obtaining locks on data items sequentially in the second order.

2. The method of claim 1, wherein restarting the transaction being processed includes rolling back the transaction, releasing any existing locks on the data items.

3. The method of claim 2, wherein the second order is consistent with the ordering rule for at least data items for which locks were obtained within the first time interval.

4. The method of claim 2, wherein the processing further includes storing information identifying positions based on the ordering rule of data items for which locks were obtained within the first time interval, and determining the second order includes determining the second order based at least in part on the stored information identifying the positions.

5. The method of claim 2, wherein determining the second order includes sorting a list of operations for obtaining the locks according to the ordering rule.

6. The method of claim 1, wherein the processing further includes determining whether or not the first order is consistent with the ordering rule, and waiting longer than the first time interval for locks on any data items for which a lock was not obtained within the first time interval if the first order is consistent with the ordering rule.

7. The method of claim 1, wherein the processing further includes determining a priority of the process that received the set of requests relative to other processes of the plurality of the multiple processes.

8. The method of claim 7, wherein restarting the transaction being processed is performed after determining the priority.

9. The method of claim 1, wherein restarting the transaction being processed is performed after determining that a state of a lock on at least one data item for which access was requested by the set of requests has changed.

10. The method of claim 1, wherein the processing further includes determining whether or not the first order is consistent with the ordering rule, and restarting the transaction being processed is performed after a second time interval from determining that first order is not consistent with the ordering rule.

11. The method of claim 10, wherein the second time interval is longer than the first time interval.

12. The method of claim 1, wherein the first time interval is less than one second.

13. The method of claim 1, wherein the processing further includes: holding any locks obtained on the data items until the transaction being processed is committed, aborted, or restarted; and releasing the locks on the data items when the transaction being processed is committed, aborted, or restarted.

14. The method of claim 1, wherein the locks on the data items include at least two states including a single unlocked state and one or more locked states.

15. The method of claim 14, wherein obtaining a lock on a data item includes changing the state of a lock associated with the data item into one of the locked states.

16. The method of claim 14, wherein releasing a lock on a data item includes changing the state of a lock associated with the data item from one of the locked states into the unlocked state.

17. The method of claim 14, wherein the locks on the data items include at least one exclusive locked state that permits only a single process full access to a locked data item.

18. The method of claim 17, wherein the locks on the data items include at least one shared locked state that permits multiple processes read-only access to a locked data item.

19. The method of claim 1, wherein at least some of the multiple processes are running asynchronously from each other.

20. The method of claim 1, wherein the transactions include database transactions and the data items are records in a database.

21. The method of claim 20, wherein the database is an in-memory database.

22. The method of claim 20, wherein the data storage system is distributed among multiple nodes of the database.

23. The method of claim 1, wherein at least some of the plurality of the multiple processes are running on different ones of the processing modules.

24. Software stored in a non-transitory form on a computer-readable medium, for processing transactions in a distributed computing system including multiple processing modules to achieve deadlock-free transaction processing, the software including instructions for causing a computing system to:

store data items in a data storage system accessible to multiple processes running in the distributed computing system, where the data items are totally ordered according to an ordering rule, and at least some of the processes are running on different processing modules; and process transactions using a plurality of the multiple processes, where processing a transaction using one of the plurality of the multiple processes includes receiving a set of requests for accessing data items stored in the data storage system, where the requests are in a first order, obtaining locks on the data items sequentially in the first order if each of the locks is obtained within a first time interval, determining a second order that is consistent with the ordering rule for at least two of the locks if any of the locks is not obtained within the first time interval, and restarting the transaction being processed, including obtaining locks on data items sequentially in the second order.

25. The software of claim 24, wherein the processing further includes storing information identifying positions based on the ordering rule of data items for which locks were obtained within the first time interval, and determining the second order includes determining the second order based at least in part on the stored information identifying the positions.

26. The software of claim 24, wherein the processing further includes determining whether or not the first order is consistent with the ordering rule, and waiting longer than the first time interval for locks on any data items for which a lock was not obtained within the first time interval if the first order is consistent with the ordering rule.

27. The software of claim 24, wherein the transactions include database transactions and the data items are records in a database.

28. The software of claim 27, wherein the data storage system is distributed among multiple nodes of the database.

29. A distributed computing system for processing transactions to achieve deadlock-free transaction processing, the distributed computing system including:
a plurality of processing modules; and
a data storage system storing data items, the data storage system accessible to multiple processes running in the distributed computing system, where the data items are totally ordered according to an ordering rule, and at least some of the processes are running on different processing modules;
wherein a plurality of the multiple processes process transactions, and processing a transaction using one of the plurality of the multiple processes includes
receiving a set of requests for accessing data items stored in the data storage system, where the requests are in a first order,
obtaining locks on the data items sequentially in the first order if each of the locks is obtained within a first time interval,
determining a second order that is consistent with the ordering rule for at least two of the locks if any of the locks is not obtained within the first time interval, and
restarting the transaction being processed, including obtaining locks on data items sequentially in the second order.

30. The distributed computing system of claim 29, wherein the processing further includes storing information identifying positions based on the ordering rule of data items for which locks were obtained within the first time interval, and determining the second order includes determining the second order based at least in part on the stored information identifying the positions.

31. The distributed computing system of claim 29, wherein the processing further includes determining whether or not the first order is consistent with the ordering rule, and waiting longer than the first time interval for locks on any data items for which a lock was not obtained within the first time interval if the first order is consistent with the ordering rule.

32. The distributed computing system of claim 29, wherein the transactions include database transactions and the data items are records in a database.

33. The distributed computing system of claim 32, wherein the data storage system is distributed among multiple nodes of the database.

34. A method for processing transactions in a distributed computing system including multiple processing modules to achieve deadlock-free transaction processing, the method including:
storing data items in a data storage system accessible to multiple processes running in the distributed computing system, where the data items are totally ordered according to an ordering rule, and at least some of the processes are running on different processing modules; and
processing transactions using a plurality of the multiple processes, where processing a transaction using one of the plurality of the multiple processes includes
receiving a set of requests for accessing data items stored in the data storage system, where the requests are in a first order,
obtaining locks on the data items sequentially in the first order if each of the locks is obtained within a first time interval,
determining whether or not the first order is consistent with the ordering rule if any of the locks is not obtained within the first time interval, and
restarting the transaction being processed if the first order is not consistent with the ordering rule.

35. The method of claim 34, wherein restarting the transaction being processed includes rolling back the transaction, releasing any existing locks on the data items, and obtaining locks on data items sequentially in a second order different from the first order.

36. The method of claim 35, wherein the second order is consistent with the ordering rule for at least data items for which locks were obtained within the first time interval.

37. The method of claim 35, wherein the processing further includes storing information identifying positions based on the ordering rule of data items for which locks were obtained within the first time interval, and determining the second order based at least in part on the stored information identifying the positions.

38. The method of claim 35, wherein the second order is determined based on sorting a list of operations for obtaining the locks according to the ordering rule.

39. The method of claim 34, wherein the processing further includes waiting longer than the first time interval for locks on any data items for which a lock was not obtained within the first time interval if the first order is consistent with the ordering rule.

40. The method of claim 34, wherein the processing further includes determining a priority of the process that received the set of requests relative to other processes of the plurality of the multiple processes.

41. The method of claim 40, wherein restarting the transaction being processed if the first order is not consistent with the ordering rule is performed after determining the priority.

42. The method of claim 34, wherein restarting the transaction being processed if the first order is not consistent with the ordering rule is performed after determining that a state of a lock on at least one data item for which access was requested by the set of requests has changed.

43. The method of claim 34, wherein restarting the transaction being processed if the first order is not consistent with the ordering rule is performed after a second time interval from determining that first order is not consistent with the ordering rule.

44. The method of claim 43, wherein the second time interval is longer than the first time interval.

45. The method of claim 34, wherein the first time interval is less than one second.

46. The method of claim 34, wherein the processing further includes: holding any locks obtained on the data items until the transaction being processed is committed, aborted, or restarted; and releasing the locks on the data items when the transaction being processed is committed, aborted, or restarted.

47. The method of claim 34, wherein the locks on the data items include at least two states including a single unlocked state and one or more locked states.

48. The method of claim 47, wherein obtaining a lock on a data item includes changing the state of a lock associated with the data item into one of the locked states.

49. The method of claim 47, wherein releasing a lock on a data item includes changing the state of a lock associated with the data item from one of the locked states into the unlocked state.

50. The method of claim 47, wherein the locks on the data items include at least one exclusive locked state that permits only a single process full access to a locked data item.

51. The method of claim 50, wherein the locks on the data items include at least one shared locked state that permits multiple processes read-only access to a locked data item.

52. The method of claim 34, wherein at least some of the multiple processes are running asynchronously from each other.

53. The method of claim 34, wherein the transactions include database transactions and the data items are records in a database.

54. The method of claim 53, wherein the database is an in-memory database.

55. The method of claim 53, wherein the data storage system is distributed among multiple nodes of the database.

56. The method of claim 34, wherein at least some of the plurality of the multiple processes are running on different ones of the processing modules.

57. Software stored in a non-transitory form on a computer-readable medium, for processing transactions in a distributed computing system including multiple processing modules to achieve deadlock-free transaction processing, the software including instructions for causing a computing system to:
   store data items in a data storage system accessible to multiple processes running in the distributed computing system, where the data items are totally ordered according to an ordering rule, and at least some of the processes are running on different processing modules; and
   process transactions using a plurality of the multiple processes, where processing a transaction using one of the plurality of the multiple processes includes
      receiving a set of requests for accessing data items stored in the data storage system, where the requests are in a first order,
      obtaining locks on the data items sequentially in the first order if each of the locks is obtained within a first time interval,
      determining whether or not the first order is consistent with the ordering rule if any of the locks is not obtained within the first time interval, and
      restarting the transaction being processed if the first order is not consistent with the ordering rule.

58. The software of claim 57, wherein restarting the transaction being processed includes rolling back the transaction, releasing any existing locks on the data items, and obtaining locks on data items sequentially in a second order different from the first order.

59. The software of claim 58, wherein the processing further includes storing information identifying positions based on the ordering rule of data items for which locks were obtained within the first time interval, and determining the second order based at least in part on the stored information identifying the positions.

60. The software of claim 57, wherein the processing further includes waiting longer than the first time interval for locks on any data items for which a lock was not obtained within the first time interval if the first order is consistent with the ordering rule.

61. The software of claim 57, wherein the transactions include database transactions and the data items are records in a database.

62. The software of claim 61, wherein the data storage system is distributed among multiple nodes of the database.

63. A distributed computing system for processing transactions to achieve deadlock-free transaction processing, the distributed computing system including:
   a plurality of processing modules; and
   a data storage system storing data items, the data storage system accessible to multiple processes running in the distributed computing system, where the data items are totally ordered according to an ordering rule, and at least some of the processes are running on different processing modules;
   wherein a plurality of the multiple processes process transactions, and processing a transaction using one of the plurality of the multiple processes includes
      receiving a set of requests for accessing data items stored in the data storage system, where the requests are in a first order,
      obtaining locks on the data items sequentially in the first order if each of the locks is obtained within a first time interval,
      determining whether or not the first order is consistent with the ordering rule if any of the locks is not obtained within the first time interval, and
      restarting the transaction being processed if the first order is not consistent with the ordering rule.

64. The distributed computing system of claim 63, wherein restarting the transaction being processed includes rolling back the transaction, releasing any existing locks on the data items, and obtaining locks on data items sequentially in a second order different from the first order.

65. The distributed computing system of claim 64, wherein the processing further includes storing information identifying positions based on the ordering rule of data items for which locks were obtained within the first time interval, and determining the second order based at least in part on the stored information identifying the positions.

66. The distributed computing system of claim 63, wherein the processing further includes waiting longer than the first time interval for locks on any data items for which a lock was not obtained within the first time interval if the first order is consistent with the ordering rule.

67. The distributed computing system of claim 63, wherein the transactions include database transactions and the data items are records in a database.

68. The distributed computing system of claim 67, wherein the data storage system is distributed among multiple nodes of the database.

* * * * *